April 18, 1950     A. E. DROBISH     2,504,817
BULB MANUFACTURING APPARATUS Filed Sept. 22, 1944     9 Sheets-Sheet 1

FIG. 1

INVENTOR
A. E. DROBISH
BY Harry C. Duft
ATTORNEY

April 18, 1950  A. E. DROBISH  2,504,817
BULB MANUFACTURING APPARATUS
Filed Sept. 22, 1944  9 Sheets-Sheet 2

INVENTOR
A. E. DROBISH
BY Harry R. Duft
ATTORNEY

FIG. 4

April 18, 1950     A. E. DROBISH     2,504,817
BULB MANUFACTURING APPARATUS
Filed Sept. 22, 1944     9 Sheets-Sheet 5

INVENTOR
A. E. DROBISH
BY Harry R. Duft
ATTORNEY

April 18, 1950   A. E. DROBISH   2,504,817
BULB MANUFACTURING APPARATUS

Filed Sept. 22, 1944   9 Sheets-Sheet 8

INVENTOR
A. E. DROBISH
BY Harry R. Duft
ATTORNEY

Patented Apr. 18, 1950

2,504,817

UNITED STATES PATENT OFFICE 2,504,817

BULB MANUFACTURING APPARATUS

Adolph E. Drobish, Lincoln, Nebr., assignor to Western Electric Company, Incorporated, New York, N. Y., a corporation of New York Application September 22, 1944, Serial No. 555,337

6 Claims. (Cl. 49—7)

This invention relates to the manufacture of bulbs and more particularly to apparatus for forming electric lamp bulbs from preformed tubular glass blanks.

An object of the present invention is to provide an apparatus for economically forming a plurality of bulbs of uniform quality from a single preformed tubular blank.

In accordance with the above object, there is provided, in one embodiment of the invention, an apparatus for forming small electric lamp bulbs of the type employed as signal indicators in telephone systems. Specifically, the apparatus comprises a supply hopper and feeding mechanism for the blanks, each blank being a glass tube of just sufficient length to produce two bulbs. Successive blanks are fed from the hopper to the feeding mechanism, which feeds the blank into a chute. In the chute, the blank moves onto a leveling device movable with a transfer mechanism and finally into position thereon, by which it is carried into coaxial alignment with reciprocable and rotatable spindles carrying chucks which are open and idle at the time and arranged adjacent opposite ends of the blank. During this latter movement of the blank, means acting thereon longitudinally centers it between the chucks. The chucks are then longitudinally advanced and in timed relation actuated to grip and rotate the blank while a cutting gas flame is played on the blank intermediate its ends. The blank is gripped and rotated initially by one chuck for a predetermined period while the flame plays thereon to heat it and then the second chuck is closed to grip and rotate it in unison with the other chuck. Upon the glass tube becoming plastic intermediate its ends, the rotating chucks are axially displaced to pull apart the two end portions of the tube, which action forms two identical partially formed bulbs having sealed end walls, and at the same time a suitable air pressure is supplied to the interior of and through the open end of each bulb to prevent the collapsing of the bulb at the point of application to the end walls of forming gas flames. The chucks now cease rotating and molds or dies are then advanced into axial alignment between the two glass bulbs while the forming gas flames continue to play on the sealed end walls thereof. The chucks are then advanced axially to enter the glass bulbs in the molds and simultaneously therewith a suitable air pressure is applied to the interior of and through the open unsealed end of each glass bulb to blow the plastic end walls into the molds to complete the formation of the two bulbs from the single blank tube. Thereafter, the last mentioned air is cut off and the chucks are displaced axially to withdraw the bulbs from the dies, the chucks also being actuated to release the bulbs and then the dies are partially retracted to align receiving members, carried thereby, with the bulbs, after which a suitable air pressure is momentarily applied to the interior of the bulbs to eject them from the chucks into the receiving members. Finally, the chucks and dies are moved to their initial positions and a blast of air of suitable pressure is momentarily applied through the spindles and chucks for cleansing purposes and one cycle of operation of the apparatus is completed. Since the gas flames are continuously on during operation of the apparatus, but only during certain periods in each cycle is it necessary that they play on the glass tube or bulbs, means comprising air nozzles are suitably arranged and controlled to remove or deflect the flames away from the work and at the same time not cause a draft of air near the work which might affect other flames being applied thereto.

Other features and advantages of this invention will more fully appear from the following detailed description, taken in conjunction with the accompanying drawings, in which.

Figure 16:
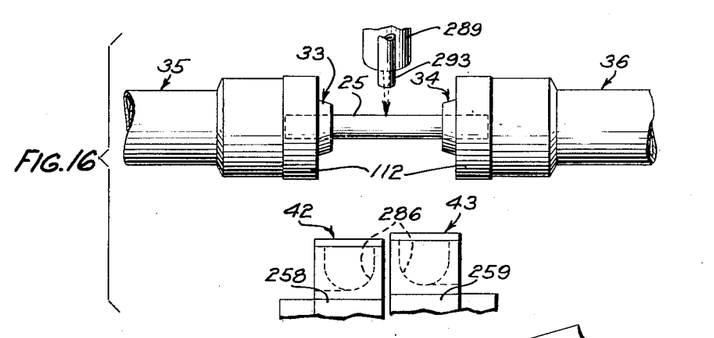
Figs. 16 to 19, inclusive, are fragmentary plan and sectional views showing the blank and tubes in relation to the spindles and chucks, molds, gas and air applying means, and finished bulb-receiving means.
Figure 17:
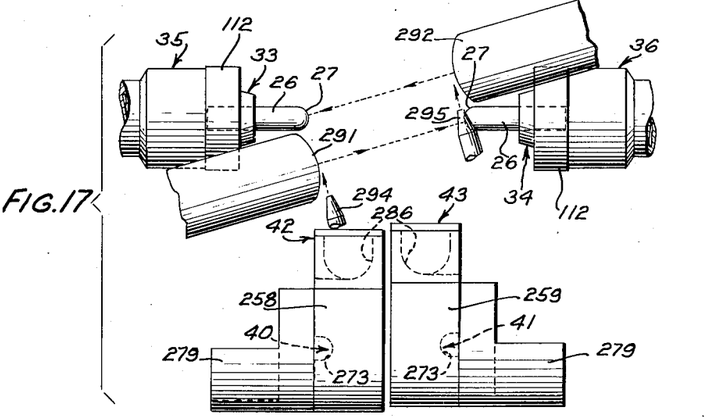

The apparatus of this invention, as shown in the accompanying drawings and to be described hereinafter, may be employed to advantage in the manufacture of small electric lamp bulbs for use as signal indicators in telephone systems. During each cycle of operation of the apparatus, a preformed tubular glass blank 25 (Figs. 12 and 16) is accurately formed into two similar bulbs 26 (Figs. 17, 18 and 19), each having a molded semi-spherical end wall 27.

Referring now to the drawings in detail, the apparatus comprises the following, indicated in general by the associated reference numerals: a hopper 28 for containing a supply of blanks 25 and a rotary blank feeding mechanism 29 for causing the blanks to be fed one at a time from the hopper to a pivotal blank transfer mechanism 30 (Figs. 4, 5 and 10) which includes means 31 in the path of the blank between the feeding and transfer mechanisms for leveling the blank. The transfer mechanism grasps and carries each blank into coaxial alignment with aligned and spaced chucks 33 and 34 attached to longitudinally reciprocable and rotatable spindle assemblages 35 and 36, respectively (Figs. 11 and 12), which are idle at the time. During the transfer of the blank 25, a centering mechanism, indicated in general at 37 (Figs. 8 and 9) longitudinally centers the blank on the transfer mechanism and thus between the chucks 33 and 34. In a manner to be later described, the blank 25 is divided into two similar parts or bulbs 26, each having a closed end wall 27, the two bulbs then being spaced apart. Thereafter, pivotally supported molds or dies 40 and 41 (Figs. 4, 5, 17, 18 and 19) are advanced into axial alignment with the bulbs 26, which are then advanced to carry their closed ends into the dies and then the end walls 27 are accurately shaped. Bulb-receiving members 42 and 43, movable with the dies 40 and 41, respectively (Figs. 6, 7, 17, 18 and 19), are then aligned with the formed bulbs, which have been withdrawn from the dies, whereupon the chucks 33 and 34 are operated to release the bulbs and they are ejected from the chucks and into the receiving members.

*Drive for chuck spindle assemblages, clutch control mechanism therefor and cam shaft*

Figure 1:
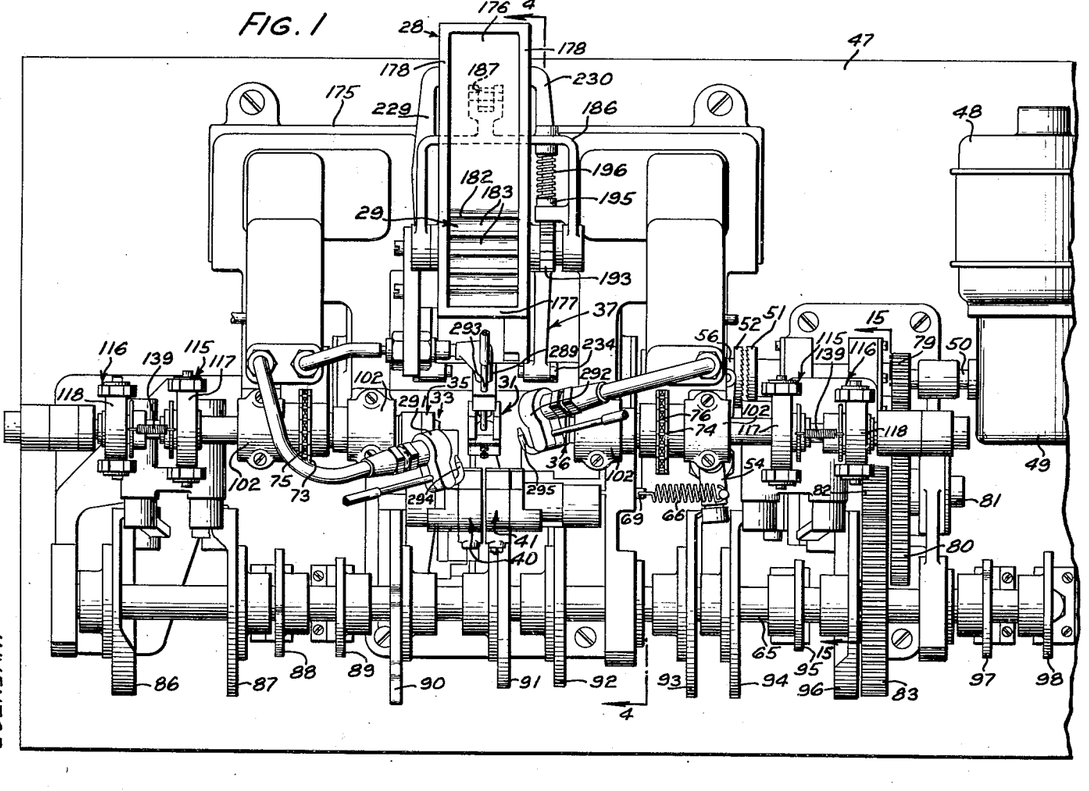
Fig. 1 is a fragmentary plan view of an apparatus for forming electric lamp bulbs from preformed tubular blanks embodying the features of the invention.

Mounted upon a horizontal base member 47 (Fig. 1) is a driving motor 48, which, through a speed reducer 49, continuously drives a jack shaft 50. The base member 47, it will be understood, also supports various suitable standards, supports and bearings for different operating parts of the apparatus, which, for the sake of simplicity, will not be specifically referred to in the following description unless necessary to an understanding of the apparatus. Fixed to the left end of the shaft 50 (Figs. 1 and 14) is a toothed clutch member 51, with which is periodically mashed a toothed clutch member 52 splined for rotation to a driven shaft 53, the clutch member 52 being moved into and out of meshing engagement with the clutch member 51 by a pivotal movement of a forked lever 54 (Fig. 14) having its furcations 55 operatively engaged in an annular channel 56 formed in the clutch member 52. To provide for a quick stoppage of the shaft 53 when the clutch is disengaged, the shaft 53 has splined thereon an annular brake shoe 57, which is yieldably pressed against a stationary brake member 58 by a compression spring 62 surrounding a shouldered portion of the brake shoe between the clutch member 52 and the brake shoe, upon the clutch member 52 being disengaged from the clutch member 51. At its forward end, as viewed in Fig. 14, the pivotal lever 54 carries a roller which is operatively engaged with a cam, to be referred to hereinafter, secured on a continuously driven cam shaft 65, a coiled tension spring 66 attached at opposite ends to the lever and a stationary pin 69 constantly maintains the lever in operative engagement with the cam. The arrangement is such that the clutch member 52 is engaged with the clutch member 51 by spring action and is positively disengaged therefrom by the cam. Fixed upon the driven shaft 53 are sprocket wheels 71 and 72, which are connected by sprocket chains 73 and 74 to sprocket wheels 75 and 76 operatively connected to the chuck spindle assemblages 35 and 36 for rotating the chucks 33 and 34, respectively.

The cam shaft 65 is continuously driven from the driving shaft 50 by means of a chain of gearing comprising a pinion 79 fixed to the shaft 50, which meshes with a gear 80 fixed to a shaft 81, to which is fixed a pinion 82 meshing with a gear 83 fixed to the cam shaft. Secured upon the cam shaft are thirteen cams numbered 86, 87, 88, 89, 90, 91, 92, 93, 94, 95, 96, 97 and 98, the purpose of which will be brought out in the further description of the apparatus. The cam 93 is the cam previously referred to with which the roller on the lever 54 is operatively engaged.

*Chuck spindle assemblages*

Figure 11:
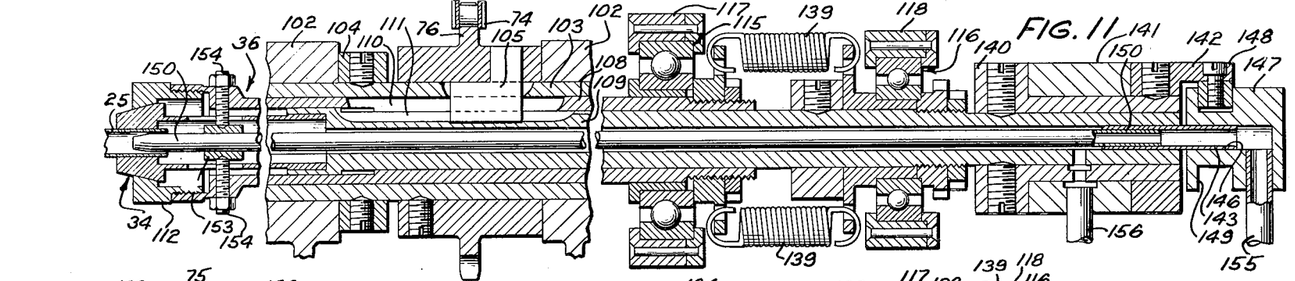
Fig. 11 is a fragmentary longitudinal central vertical section through the right hand spindle of Fig. 1.

Each of the chuck spindle assemblages 35 and 36 are identical in structure, but they are operated in certain respects at different periods in the cycle of operation of the apparatus in a manner and for a purpose to be referred to hereinafter. The following detailed description, although specifically directed to the right hand spindle assemblage 36 (Figs. 2, 11, 12 and 16), also applies to the left-hand spindle assemblage 35, and assemblages being merely reversed. Referring particularly to Fig. 11, fixed spaced bearings 102 are interconnected by a sleeve 103 rotatably fitted therein, which is held in one direction in fixed longitudinal relation with the bearings by a collar 104 secured thereon and abutting the left hand bearing 102 and in the opposite direction by the sprocket wheel 76 secured thereto and abutting the right hand bearing 102. A splined key 105 secured to the sprocket wheel 76 rotatably connects the sprocket wheel to the sleeve 103, as well as to a sleeve 108 fitted for reciprocatory movement within the sleeve 103 and also to a sleeve 109 fitted for reciprocatory movement within the sleeve 108, the two sleeves 108 and 109 being reciprocated in timed relation during the operation of the apparatus by means to be presently described, for the purpose of closing and opening the chuck 34 to grip and release the blank 25 and for reciprocating the spindle assemblage 36 bodily. Suitably dimensioned slots 110 and 111 are provided in the sleeves 108 and 109, respectively, for receiving the splined key 105 to permit the desired movements of the sleeves. Attached to the outer end of the reciprocatory sleeve 108 is a chuck head 112, which is tapered inside to slide upon the spring collet or chuck 34, which is tapered outside to fit the taper of the head, the chuck being secured to the reciprocatory sleeve 109.

Figure 12:
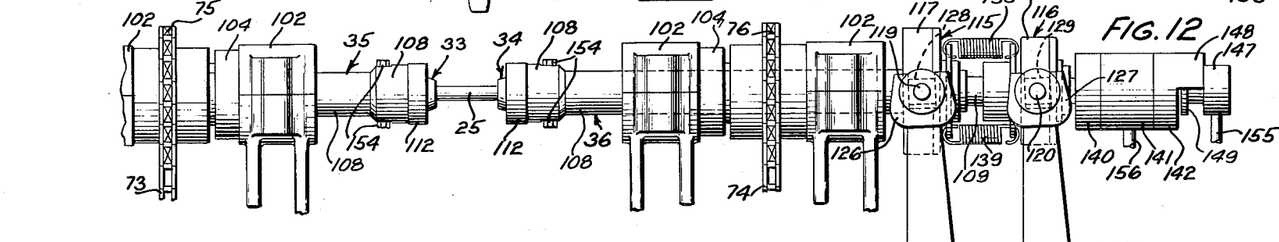
Fig. 12 is a fragmentary side view of the spindles in their advanced position and illustrating the means for reciprocating the right hand spindle and operating the chuck.
Figures 14, 15:
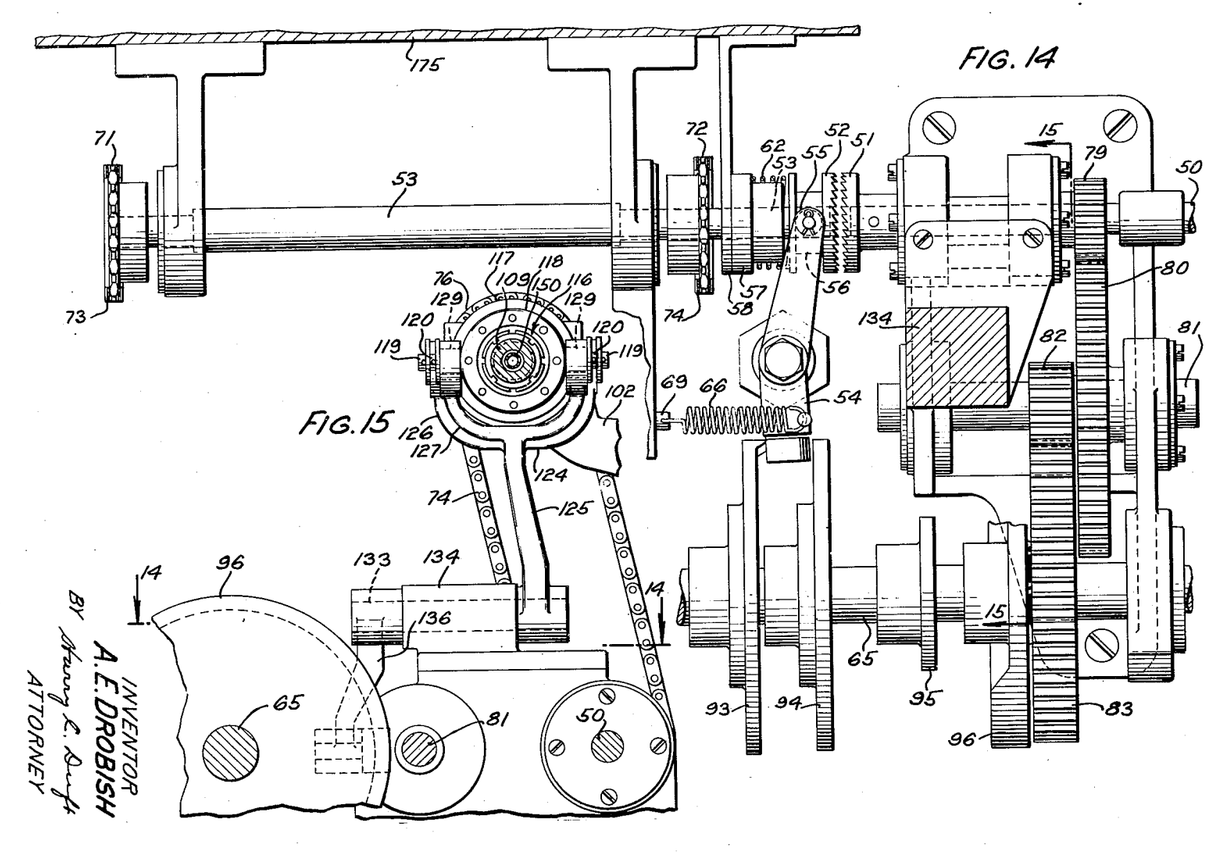
Fig. 14 is a plan section on an enlarged scale of a portion of Fig. 1, taken substantially on line 14—14 of Fig. 15 and illustrating the drive arrangement for a cam shaft and spindle drive and clutch control mechanism for periodically rotating the spindles.
Fig. 15 is a vertical irregular section taken on lines 15—15 of Figs. 1 and 14 showing the cam actuated lever for reciprocating the right hand spindle of Fig. 1.

Suitably secured from longitudinal movement upon the inner end of the sleeve 108, which is shorter than the sleeve 109, is a ball bearing assemblage 115. Also secured from longitudinal movement upon the sleeve 109 in suitable spaced relation to the bearing assemblage 115 is a ball bearing assemblage 116. Each of the ball bearing assemblages 115 and 116 is surrounded by cooperating annular flanged sets of members 117 and 118 secured thereto, respectively, and each set of members has fixed thereto, at diametrically opposite points, pins 119 and 120, respectively, (Figs. 12 and 15). Operatively engaged with the pins 119 and 120 are pivotal forked levers 124 and 125 having their furcations 126 and 127, respectively, engaged with bearing blocks 128 and 129 freely rotatably carried on the pins, respectively. The levers 124 and 125 are attached at their pivoted lower ends to shafts 132 and 133 journalled in a bearing block 134, the shafts also having fixed thereon levers 135 and 136 carrying rollers which are operatively engaged with the cams 94 and 96, respectively. The levers 135 and 136 of the left hand spindle assemblage 35 are similarly associated with the continuously rotating cams 87 and 86, respectively. A set of diametrically opposed coiled tension springs 139 secured at opposite ends to flanged members forming parts of the means effective to retain the ball bearing assemblages 115 and 116 from longitudinal movement upon their supporting sleeves 108 and 109, respectively, serve to normally urge and maintain the reciprocatory chuck head actuating sleeve 108 towards the right, as viewed in Fig. 11, to cause the chuck 34 to grip the glass blank 25 periodically, which movement of the sleeve 108 is under the control of the continuously rotating cam 94 through the operatively connected levers 124 and 135. Periodically, the cam 94, through the interconnecting levers 135 and 124, shifts the sleeve 108 towards the left to permit the chuck 34 to open. The bodily advancing and retracting of the spindle assemblage 36 at predetermined periods in the cycle of operation is under the control of the cam 96 through the interconnecting levers 136 and 125 and, during these movements, no movement of the sleeve 108 with the chuck head 112 relative to the sleeve 109 occurs due to the cooperating tapered faces of the chuck and head and the action of the springs 139.

Upon the right end of the rotatable sleeve 109 (Figs. 11 and 12) is secured a flanged collar 140, upon the reduced diameter of which is freely rotatably fitted a collar 141. The collar 141 is retained longitudinally upon the collar 140 by a collar 142 secured to rotate with the collar 140. Extending into and freely rotatable in the bore of the sleeve 109 is a sleeve 143, which is drive-fitted at its outer end in a central aperture 146 of a collar 147, which is retained longitudinally upon the spindle 109 by an arm 148 extending from the collar 142 and operatively engaged in an annular channel 149 formed in the sleeve 143. Drive-fitted into the bore of the sleeve 143 is a tube 150, which extends the entire length of the sleeve 109 and into the chuck 34 and the chucked glass blank 25. As clearly shown in Fig. 11, the outer peripheral surface of the tube 150 is spaced from the inner peripheral wall of the glass blank for a purpose to be presently described and the end of the tube is tapered so that when the blank is entered into the chuck 34, there will be no interference from the tube. A collar 153 surrounding and rotatable upon the end of the tube, which extends into the blank 25, serves as a support for the latter end of the tube 150, the collar being adjustably positioned by a plurality of set screws 154 carried by the rotatable sleeve 108.

*Compressed air supply and control thereof to interior of spindle assemblages*

Figure 13:
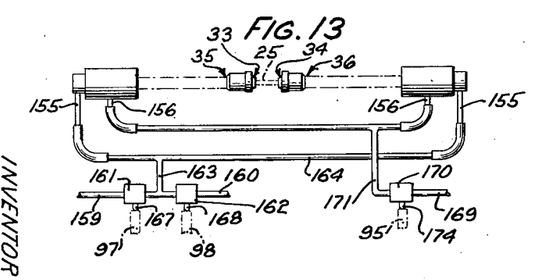
Fig. 13 is a diagrammatic illustration of the air system connected to the spindles for applying air of suitable different pressures to the interior of the blanks and the bulbs during certain periods in the operation of the apparatus.

Communicating with the central aperture 146 of the collar 147 is a depending conduit 155, through which compressed air of different suitable pressures, for example, pressures suitably throttled from three and six pound air pressure supply sources, are periodically supplied to the tube 150 and thus to the interior of the blank 25. The lower air pressure is supplied to the interior of each of the bulbs 26 during the application of gas flames, to be described hereinafter, to the end walls 27 thereof to partially form them previous to such walls being finally molded, the applied lower air pressure being effective to maintain the shape of the walls and prevent the bulbs from collapsing at the points of application of the flames. To effect a molding of the walls 27 of the bulbs 26, which are plastic at the time, the walls are blown by the higher air pressure into the molds 40 and 41 moved into position for receiving the closed ends of the bulbs and this same air pressure is again directed into the bulbs at another period to eject the same from the chucks 33 and 34 into the receiving members 42 and 43. The molds and receiving members will be more clearly described hereinafter. A depending conduit 156 fixed to the collar 141 communicates with the space surrounding the tube 150 within the sleeve 109, through which compressed air of high pressure, for example substantially 90-pound air pressure, is supplied. The purpose of the 90-pound air is to flush and clean out the spindle assemblages 35 and 36 at the end of each cycle of operation of the apparatus. As shown diagrammatically in Fig. 13, the conduits 155 of the spindle assemblages 35 and 36 are periodically connected to the throttled three and six pound air pressure supply conduits 159 and 160, respectively, which are supplied from suitable supply sources (not shown). The conduits 159 and 160 are connected to suitable air valves 161 and 162, respectively, having their inlet ports communicating with a common conduit 163, which communicates with a common conduit 164, which, in turn, communicates with each of the conduits 155. Spring-pressed plungers 167 and 168 of the valves 162 and 163, respectively, are periodically actuated to permit either throttled three pound or six pound air pressures to be directed into the interior of the blank 25 by the continuously rotating cams 97 and 98 operatively engaging the plungers, respectively. An air pressure supply conduit 169 supplied from a suitable source (not shown) is periodically connected to the conduits 156 of the spindle assemblages 35 and 36, through the actuation of a suitable air valve 170 having its outlet port communicating with a common conduit 171 communicating with each of the conduits 156. A spring-pressed plunger 174 of the valve 170 is periodically actuated by the continuously rotating cam 95, which operatively engages the plunger. It will be understood that due to the weight of the conduits 155 and 156 depending from the collars 147 and 141, respectively, the latter which are rotatably carried upon the rotating sleeve 143 and collar 140, respectively, do not rotate therewith.

From the foregoing description, it will be apparent that when the clutch members 51 and 52, under the control of the continuously rotating cam 93, are engaged by the action of the spring 66, the drive from the continuously driven jack shaft 50 to the spindle assemblages 35 and 36 will be complete and that the chucks 33 and 34 thereof will be rotated and upon disengagement of the clutch members a quick stoppage of rotation of the chucks will be effected by the pressure of the brake shoe 57 against the brake member 58. Further, under the control of the continuously rotating cams 94 and 96 associated with the spindle assemblage 36, as well as the continuously rotating cams 87 and 86 associated with the spindle assemblage 35, the spindle assemblages will be bodily advanced and retracted periodically in unison during each operating cycle and the chucks 33 and 34 will be opened to receive and grip the ends of the blanks 25 and then to release the two bulbs 26 formed from each blank during each operating cycle, the opening of the chucks being effected when the sleeves 108 are advanced away from the chucks. It will be understood that during all other priods in the operating cycle, the chucks are caused to grip the blanks and bulbs due to the normal action of the springs 139 in advancing the chuck sleeves 109 toward the chuck heads 112. Also, different air pressures for the purpose described hereinbefore will be applied to the interior of the glass bulbs 26 at predetermined periods in each operating cycle in the manner previously described through the valves 161, 160 and 170 under the control of the continuously rotating cams 97, 98 and 95, respectively.

*Blank supply hopper, blank feeding, levelling and transfer mechanisms for positioning blanks in axial alignment with the chucks, and mechanism for longitudinal centering of the blanks between the chucks*

Figure 4:
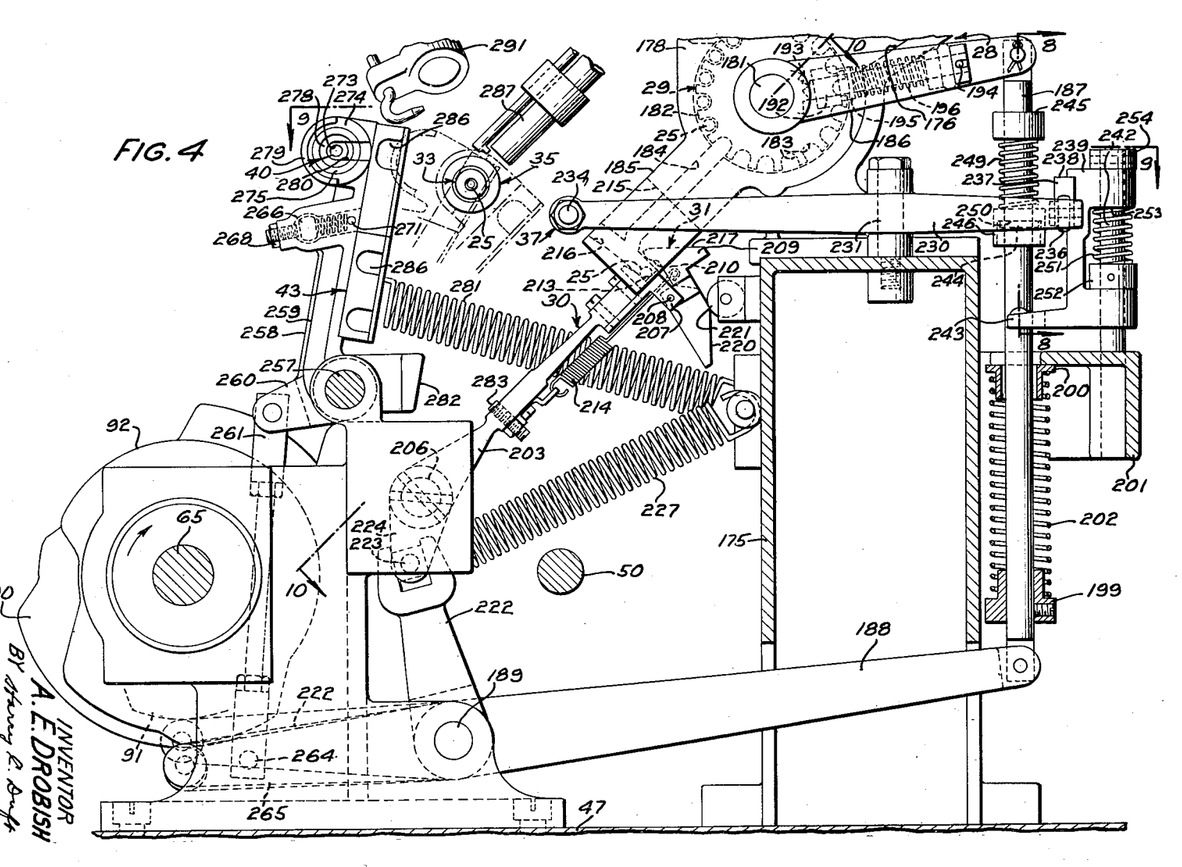
Fig. 4 is a fragmentary irregular vertical section on an enlarged scale, taken on line 4—4 of Fig. 1, illustrating the position of the blank transfer mechanism immediately after receiving a blank from the feeding mechanism.
Figures 5, 6, 7:
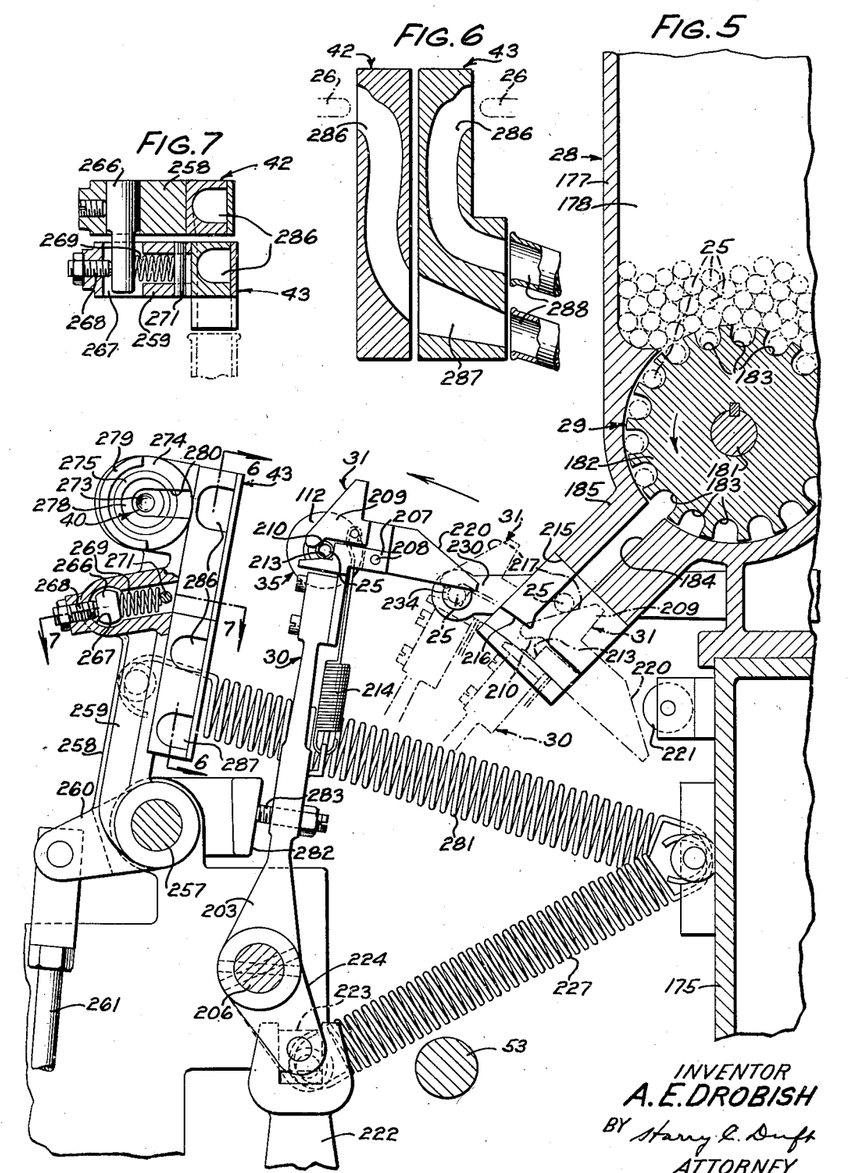
Fig. 5 is a view similar to Fig. 4 showing fragmentarily the blank supply hopper and feeding mechanism in section and the position of the blank transfer mechanism after delivering and axially aligning a blank with its holding chucks.
Fig. 6 is a vertical section taken on line 6—6 of Fig. 5.
Fig. 7 is a plan section taken on line 7—7 of Fig. 5.

Mounted on a standard 175 (Figs. 4 and 5) carried by the base member 47 is the supply hopper 28 for the blank glass tubes 25, which has a downwardly sloping rear wall 176, a front vertical wall 177 and parallel side walls 178. Journalled in the side walls 178 adjacent the bottom of the hopper is a shaft 181 having keyed to rotate therewith a circular blank carrying member 182 of the blank feeding mechanism 29. Formed in the periphery of the member 182 and extending completely across the width thereof are a plurality of equally spaced blank-receiving pockets 183, into which blanks 25 are deposited from the hopper 28 by the action of gravity during intermittent rotation of the member 182 in the direction of the arrow (Fig. 5). The wall of the hopper 28 surrounding the greater portion of the member 182 is shaped to conform therewith and suitably spaced therefrom so that the blanks 25 will be freely carried in the pockets 183, which are intermittently aligned with an inclined chute or channel 184 formed in an arm 185 on the hopper 28, whereupon the aligned blank freely falls by the action of gravity into the channel and onto the levelling means 31 carried by the pivotal transfer mechanism 30 positioned to receive it. The latter mechanism will be described hereinafter.

Journalled on opposite ends of the shaft 181 (Figs. 4 and 10) is a yoke member 186, which, at its outer end, is forked to receive the upper end of a rod 187 pivoted thereto, the lower end of the rod being pivoted to a forked end of a lever 188 pivoted upon a stationary shaft 189 and carrying a roller at its opposite end which rides on the continuously rotating cam 91. Carried by the yoke member 186 is a spring-pressed pawl 192, which is operatively engaged with a ratchet wheel 193 fixed to the shaft 181. The pawl 192 freely extends at its outer end through an aperture in the yoke member 186 and is prevented from rotating about its own axis by a pin and slot connection, indicated at 194 (Fig. 4) between the yoke member and the pawl. Adjacent its inner end, the pawl has pinned thereto a collar 195 and surrounding the pawl, between a boss on the yoke member and the collar 195, is a compression spring 196, the normal inward movement of the pawl toward the teeth of the ratchet wheel being limited by the collar. Surrounding the rod 187 between a collar 199 fixed thereto and a collar 200 free on the rod, which is backed by a bracket 201 fixed to the standard 175, is a compression spring 202, which is effective to normally urge the rod 187 downwardly. Thus, it will be apparent that under the control of the continuously rotating cam 91 and the operatively connected lever 188 and spring pressed rod 187, the spring pressed pawl 192 and ratchet wheel 193 will index the blank carrying member 182 to cause a glass tube blank 25 to drop into the inclined chute or channel 184 during each operating cycle. As shown in Fig. 4, the feeding mechanism 29 is shown at the end of its feeding operation, a blank 25 having been deposited in the channel 184 and dropped onto the transfer mechanism 30.

The transfer mechanism 30, which receives and carries the blanks 25 intermittently dropped into the chute or channel 184 into coaxial alignment with the chucks 33 and 34, referring particularly to Figs. 4, 5, 6, 9 and 10, comprises an arm 203 pinned at its inner end to a suitably journalled rock shaft 206. Attached to the outer or free end of the arm 203 is an irregular shaped forked bracket 207, between the forks of which is pivoted at 208 the blank levelling means 31 comprising a cam actuated forked blank levelling and retaining member 209, the forks thereof having faces 210 (Fig. 5) which cooperate with a shouldered face 213 on the bracket 207 to retain a blank 25 on the transfer mechanism 30 during its movement into coaxial alignment with the chucks 33 and 34. A tension spring 214 attached at opposite ends to the arm 203 and the pivotal member 209 serves to normally move the latter into blank retaining position with the bracket 207. This is clearly illustrated in Fig. 5. The arm 203, in its pivotal movement with the rock shaft 206, moves into a passage 215 provided in a forked end of the arm 185 on the hopper 28, the forks having opposed arcuate shaped slots 216 in their inner faces, which communicate with the passage 215, for freely receiving opposite ends of the blank 25. As the transfer arm 203 moves clockwise (Fig. 5) with its rocking shaft 206, an inclined face 217 on the blank levelling retaining member 209 moves into the passage 215 in the path of a blank 25 dropped in timed relation therewith down the channel 184. The position of the face 217 of the member 209 in the channel 184 at this time, and which checks the movement of the blank, serves to level the blank 25, thus preventing it from getting lodged in the chute. Thereafter, in the continued clockwise movement of the transfer arm 203, a cam face 220 on the blank levelling and retaining member 209 engages a roller 221 (Fig. 4), which serves to rock the member 209 clockwise (Figs. 4 and 5) to move the cam face 217 from the path of the blank and then the blank is free to fall against the shouldered face 213 on the bracket 207. This is best shown in Fig. 4.

The movement of the rock shaft 206, to which the transfer arm 203 is fixed, is under the control of the continuously rotating cam 92 by means of a bell crank lever 222 pivoted upon the stationary shaft 189, the longer arm of the lever carrying a roller which rides on the cam and its shorter arm being forked and operatively engaged at 223 with an end of a lever 224 pinned to the rock shaft 206. A tension spring 227 attached at opposite ends to the standard 175 and an arm 228 (Fig. 10) on the transfer arm 203 constantly urges the rock shaft 206 to rotate in a counter-clockwise direction (Fig. 4) and thereby to move the transfer arm 203 from its extreme right hand position (Fig. 4) to its extreme left hand position (Fig. 5) to be more fully described hereinafter. Thus, as the roller on the lever 222, which is riding upon the periphery of the cam 92, follows the cam contour, the transfer arm 203 will be predeterminedly moved back and forth during each operating cycle of the cam.

Figures 8, 9, 10:
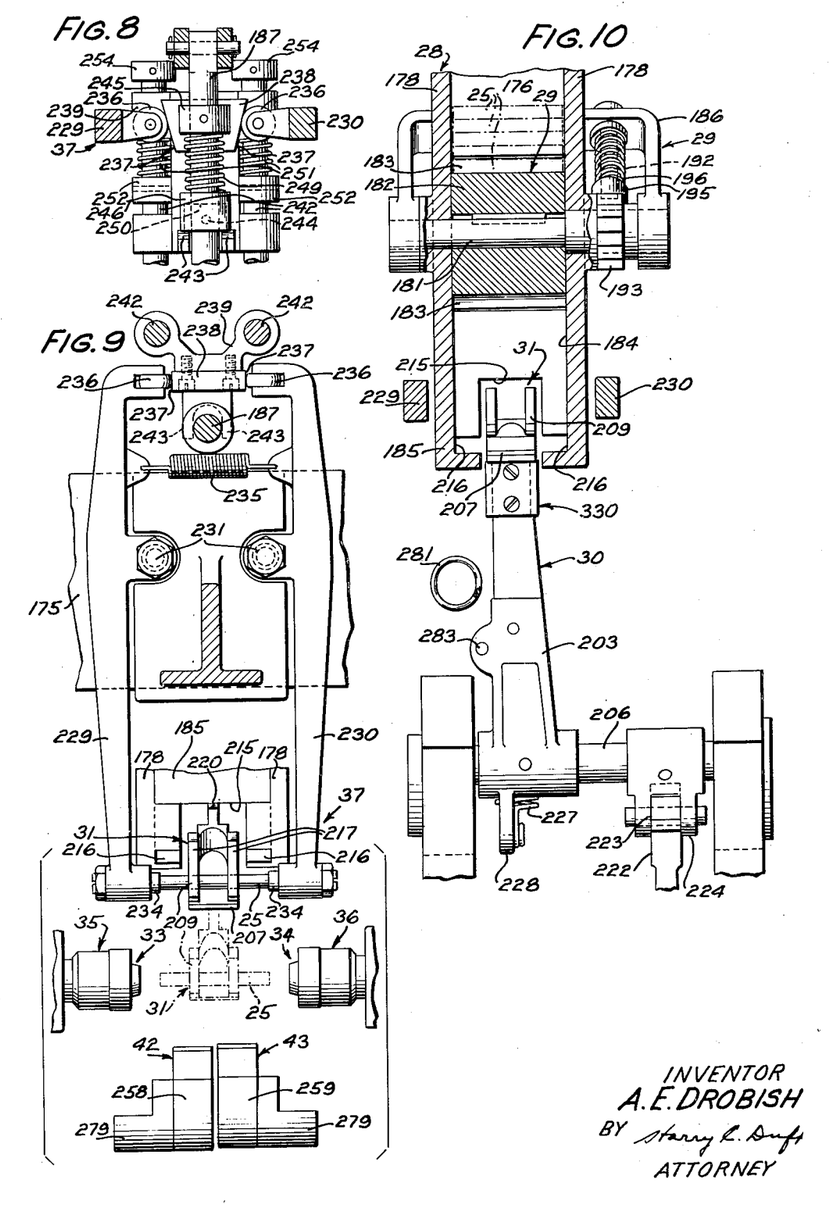
Fig. 8 is a vertical section taken on line 8—8 of Fig. 4 with the parts operated to another position than that shown in Fig. 4.
Fig. 9 is a fragmentary irregular plan section taken on line 9—9 of Fig. 4 illustrating the means employed to longitudinally center the blank on the transfer mechanism before alignment with the chucks.
Fig. 10 is a fragmentary irregular oblique section taken on line 10—10 of Fig. 4.

Means for accurately longitudinally centering the glass blank tube 25 between the chucks 33 and 34 while supported on the retaining jaws of the transfer arm 203 and before the blank is aligned with and grasped by the chucks comprises the following mechanism: A pair of spaced members 229 and 230 movable in a horizontal plane about vertical pivots 231 carried on the standard 175, each support, at one end, an adjustable contact member 234, the longitudinal axes of which coincide with the longitudinal axis of the blank at one point at which it stops in its travel as it is carried into axial alignment with the chucks 33 and 34. Normally, the contact members 234 are urged apart by a tension spring 235 connected at its ends to the members 229 and 230 (Fig. 9) between their pivots 231 and the ends thereof opposite their ends carrying the contact members. The former ends of the members 229 and 230 support rollers 236 (Fig. 8), which constantly ride upon opposite cam faces 237 of a vertically reciprocable plate 238 attached to a bracket 239 reciprocably mounted on guide rods 242 fixed to the bracket 201. At its lower end, the bracket 239 is forked and the forks 243 thereof span the rod 187. Fixed to the rod 187 above the forks 243 in spaced relation is a pin 244 and a collar 245. Slidable upon the rod 187 between the pin 244 and the collar 245 is a cup-shaped collar 246, which is normally urged downwardly by a compression spring 249, surrounding the rod 187 between the collars 245 and 246. As shown in Fig. 4, the rod 187 is in its uppermost raised position, wherein the pin 244 carried thereby has engaged an annular inner face 250 of the collar 246 (Figs. 4 and 8) and raised it to compress the spring 249. Compression springs 251 surrounding the guide rods 242 between collars 252 fixed on the rods and faces 253 of the bracket 239 serve to normally urge the bracket upwardly to maintain the forks 243 thereon engaged with the collar 246. Collars 254 fixed upon the upper ends of the guide rods 242 serve as stop members to limit the upward movement of the bracket 239 and thereby the plate 238 having the cam faces 237 thereon, which upward movement of the bracket 239, referring to Figs. 8 and 9, will cause identical movements to the pivotal members 229 and 230 to carry the blank engaging members 234 thereon away from each other under the urging of the spring 235. When the rod 187 is lowered, the spring 249 previously compressed, acts, through the collar 246 and bracket 239, to lower the cam plate 238, which movement will cause identical movements of the contact members 234 on the pivoted members 229 and 230 toward each other, the action of the spring 235 being overcome. The last described movements of the contact members takes place when a blank 25 is positioned between and coaxially aligned with the contact members 234. It will be apparent, since the movements of the contact members 234 toward the ends of the blank are identical, that the blank will be centered between the chucks 33 and 34. In Fig. 8, the bracket 239 is shown in its lowermost position, the pin 244 being spaced from the face 250 of the collar 246 and, consequently, the pivotal members 229 and 230 will have been moved to carry their contact members 234 into engagement with the ends of the blank, as shown in Fig. 9.

*Dies for molding end walls of bulbs and bulb-receiving members carried thereby*

Figure 18:
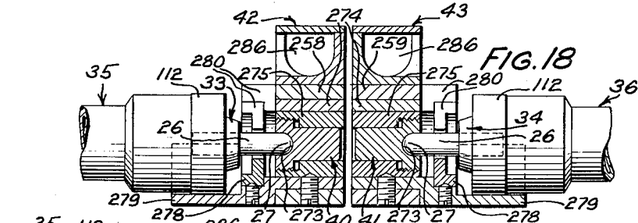

A suitably supported stationary stud shaft 257 (Figs. 2, 4 and 5) rotatably supports two adjacent levers 258 and 259, the lever 258 having an arm 260, which is connected by a link 261 pivoted at 264 to a lever 265 pivoted at one end on the shaft 189 and carrying a roller at its opposite end, which rides on the continuously rotating cam 90. The lever 259 receives its motion from the lever 258 by means of a pin 266 (Fig. 7) fixed to the latter lever intermediate its ends, which extends freely into an aperture 267 in the lever 259. Flattened opposite sides of the pin 266 are engaged by an adjustable stop screw 268 and one end of a compression spring 269 carried in the lever 259, the opposite end of the spring abutting a pin 271 also carried in the lever 259. This yieldable connection between the levers 258 and 259 is for a purpose which will be described hereinafter. At their outer or free ends, the levers 258 and 259 (Figs. 17, 18 and 19) each support a molding die and since each of the dies, indicated at 40 and 41, and their mounting in the levers is similar, the description which follows applies to each. For example, the die 40, preferably of Monel metal, is provided with a molding cavity 273, the cavities in the two dies facing in opposite directions at the outer sides of the levers for receiving the closed ends of the bulbs 26. Concentric ring-shaped inserts 274 and 275 are fixed in an aperture formed in the free end of the levers 258 and 259 and the die 40 is longitudinally adjustably fitted in the inner insert 275. At the open end of the die 40 is an apertured insert 278, which is fixed to the outer insert 274, the aperture therein freely admitting the bulb 26 when advanced into the molding cavity 273. Integral with the outer insert 274 is a semi-circular shoe or stop member 279, the inner surface of which, as shown in Fig. 18, snugly abuts the peripheral surface of the chuck head 112 when the die 40 is coaxially aligned with the chuck supported bulb 26 upon the lever 258 being rocked clockwise from the full line positions shown in Figs. 4 and 5 to the right hand dotted outline position shown in Fig. 4, wherein the die 40 is in position to receive the bulb. As clearly shown in Figs. 4 and 19, the outer insert 274 and the end insert 278 are radially slotted, as indicated at 280, to clear the bulb 26 extending from the chuck 33 during the referred-to movement of the lever 258. A tension spring 281 attached at opposite ends to the standard 175 and to the die supporting and operating lever 258 constantly urges the lever 258 and the lever 259 yieldably connected thereto in the manner previously described to rotate on the stud shaft 257 in a clockwise direction from its extreme left hand position to its extreme dotted outline right hand position (Fig. 4). Thus, as the roller on the lever 222, which is riding upon the periphery of the cam 90, follows the cam contour, the die actuating levers 258 and 259 will be predeterminedly moved back and forth during each operating cycle of the cam. The purpose of the yieldable connection between the die carrying levers 258 and 259, previously described, and the stop members 279 movable with the levers and which stop members come to rest against the chuck heads 112, is to insure that the dies 40 and 41 will be individually coaxially aligned with the bulbs 26, the cam roller on the lever 222 being free of the cam 90 during this period in the cycle.

Attached to the support which carries the stud shaft 257 is a stop member 282 (Figs. 4 and 5), which is engaged by an adjustable screw 283 mounted on the transfer arm 203 for the blanks 25. The arrangement is such that when the transfer arm 203 is rocked counterclockwise by the action of the tension spring 227 under the control of the cam 92, it will come to a rest with the blank 25 carried thereby in coaxial alignment with the chucks 33 and 34, at which period the roller on the lever 222 is free of the control cam 92.

Figure 19:
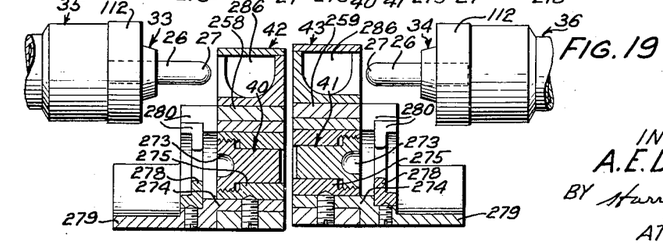

Fixed to the levers 258 and 259 are the bulb receiving members 42 and 43, respectively (Figs. 4, 5, 6 and 7), terminating at their upper ends (Figs. 6, 18 and 19) at the outer sides of the members in bulb receiving passages 286 and when the levers are rocked to a predetermined position, as shown in Fig. 19, the passages are in alignment with the bulbs 26 carried in the chucks 33 and 34. At its lower end, the passage 286 of the member 42 communicates with a passage 287 in the member 43. Fixed tubes 288 (Figs. 2 and 6) are so arranged that when the members 42 and 43 are in position (Fig. 19) for receiving the bulbs 26 from the chucks 33 and 34, the bulbs being ejected by air pressure supplied to the interiors thereof, in the manner described hereinbefore, from the chucks, which are open at the time, they will be delivered into the tubes 288, from which they pass, into a suitable magazining device (not shown).

*Cutting and forming gas flame burners and air nozzles for periodically deflecting the flames*

Figure 3:
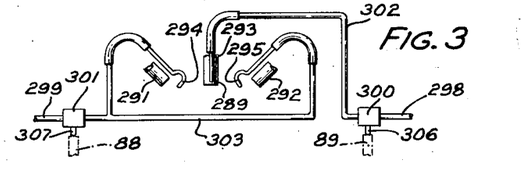
Fig. 3 is a diagrammatic illustration of the air pressure system and nozzles for deflecting the gas flames from the work during certain periods in the operation of the apparatus.

A gas burner 289 is provided for directing a suitable cutting flame against the periphery of the rotating glass blank 25 intermediate its ends (Figs. 3 and 16) while grasped by the chucks 33 and 34. Other gas burners 291 and 292 are provided for directing suitable forming flames against the end walls 27 of the partially formed rotating bulbs 26 (Figs. 3 and 17) after the blank 25 has been pulled apart to maintain the walls plastic for the molding operation which follows immediately. The burners 289, 291 and 292 are connected to a suitable gas supply source (not shown) and the gas flames from the burners are continuously on during operation of the apparatus. It is desirable that the flame from the cutting burner 289 should have a normal direction for playing on the periphery of the blank 25 for a predetermined period during each operating cycle and also in the case of the flames from the end wall forming burners 291 and 292, which should have a normal direction only after the blank 25 has been pulled apart and up to the molding of the end walls 27 of the bulbs 26. At other periods in the operating cycle, the flames are deflected in right angular directions from their normal path away from the blank and tubes, thus preventing the flames from playing on the blank and tubes when it is not necessary and also to prevent the forming of air drafts on the work which might affect the other flame or flames being applied to the work.

Air emitted under throttled six-pound pressure periodically from suitably arranged nozzles 293, 294 and 295 is employed to deflect the flames in the desired manner from the burners 289, 291 and 292, respectively. As shown diagrammatically in Fig. 3, the nozzles are periodically connected to throttled six-pound air pressure supply conduits 298 and 299, which are supplied from a suitable supply source (not shown). The conduits 298 and 299 are connected to suitable air valves 300 and 301, respectively, having their outlet ports communicating, in the case of the valve 300, with a conduit 302 connected to the nozzle 293 and of the valve 301 with a common conduit 303 connected to each of the nozzles 294 and 295. Spring-pressed plungers 306 and 307 of the valves 300 and 301, respectively, are periodically actuated to permit six-pound air pressure to be emitted through the nozzles by the continuously rotating cams 88 and 89, respectively.

*Operating cycle*

It is believed, from the foregoing detailed description of the automatic apparatus, as applied to the forming of electric lamp bulbs for use in telephone systems, wherein two similar lamp bulbs 26 are simultaneously formed from a preformed tubular glass blank 25, that its mode of operation is apparent. However, it may be well to indicate, by way of summary, what such general operation involves.

It is to be understood that each complete revolution of the continuously rotating cam shaft 65 completes a cycle of operation of the apparatus during which two bulbs 26 are formed. Also, it will be assumed that the cams 86, 87, 88, 89, 90, 91, 92, 93, 94, 95, 96, 97 and 98 have all been formed with suitable peripheral or side face contours, as well as adjusted relative to each other upon the shaft 65 to time correctly the periodic movements of the various mechanisms to be effected thereby, and this timing will be apparent from the diagram shown in Fig. 20. In the various figures of the drawings, no attempt has been made to show the exact configuration of the cam faces, since it will be apparent from the above description how they should be cut to produce the required movements.

Figure 20:
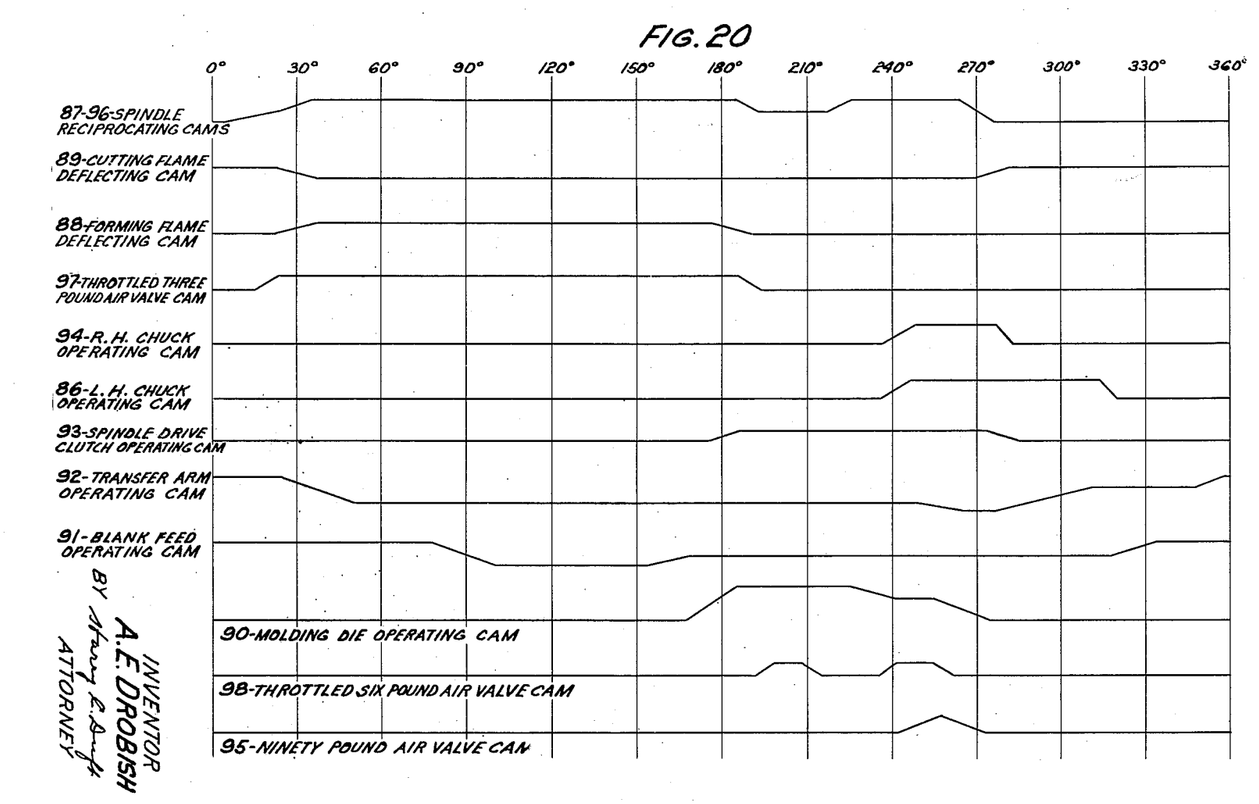
Fig. 20 is a timing diagram for various control cams illustrating the time of operation of different cooperating mechanisms of the apparatus.

A better understanding of the above-described apparatus may be had by reference to the following brief description of the operation thereof when considered in conjunction with the timing diagram of Fig. 20. As shown in Fig. 4, a blank 25 has just been received by the transfer mechanism 30 and is resting against the shouldered face 213 thereof, which movement of the blank occurred as the transfer arm 203 reached its extreme right hand position, whereupon the pivotal blank levelling and retaining member 209 was moved clockwise upon the cam face 220 thereof engaging the roller 221. Previous to this position of the blank 25, it was resting level upon the inclined face 217 of the member 209, as shown in the right hand dotted outline position of the transfer mechanism in Fig. 5, where it had dropped in the last intermittent rotary movement of the member 182 of the blank feeding mechanism 29, effected by its actuating pawl 192, as the actuating rod 187 of the feeding mechanism 29 was moved to its uppermost raised position, as shown in Fig. 4. At this point in the cycle, the blank 25, last transferred to and gripped by the chucks 33 and 34, is being rotated, since the spindle assemblages 35 and 36 are in their advanced positions, the chucks 33 and 34 closed and the spindle drive clutch members 51 and 52 engaged. Also, the cutting flame from the burner 289 is playing on the rotating blank 25 intermediate its ends (Fig. 16), since the deflecting air through the nozzle 293 has been cut off by the closure of the valve 300 and the forming flames from the burners 291 and 292 are being deflected from their normal direction by the deflecting air from the nozzles 294 and 295, respectively, the valve 301 being open. The arms 258 and 259 supporting the molds or dies 42 and 43, respectively, are at this period, as shown in Fig. 4, in their retracted or clearance left hand position. It will also be understood that at this period in the cycle the valves 160, 161 and 170 are closed off so that no air pressure is being directed for the purposes and in the manner previously described into the interior of the spindle assemblages 34 and 35.

With the just described conditions of the various mechanism of the apparatus and upon the glass blank tube 25 becoming plastic intermediate its ends after it is subjected for a predetermined period to the cutting flame from the burner 289, the spindle assemblages 35 and 36 carrying the rotating chucks 33 and 34 are axially displaced under the control of the cams 86 and 96, respectively, to pull apart the end portions of the tube, which action forms two identical partially formed bulbs 26 having sealed end walls 27. During the splitting of the blank 25, the throttled three-pound air pressure is supplied to the interior of each bulb 26 to maintain the shape of the end walls 27 and prevent the collapsing of the bulbs while the forming flames are being applied. This is effected by the opening of the valve 161. The cutting flame from the burner 289 is immediately deflected from its normal direction upon the splitting apart of the blank 25 by the air from the nozzle 293 due to the opening of the valve 300 and simultaneously therewith the forming flames from the burners 291 and 292 are directed against the end walls 27 of the bulbs 26 (Fig. 17) to maintain them plastic by the cutting-off of the air through the nozzles 294 and 295, the valve 301 having been closed.

Upon the splitting of the blank 25 into the tubes 26, the transfer arm 203, with a blank in position thereon as described hereinbefore, is advanced counterclockwise (Fig. 4), whereupon the spring closed blank retaining member 209 is disengaged from the roller 221 and moves counterclockwise to yieldably grip the blank 25 to the transfer arm, as shown in dotted outline in the intermediate dotted outline position of the arm in Fig. 5. In this position of the transfer arm, the blank 25 is coaxially aligned with the contact members 234 of the mechanism 37, which members are in their retracted positions at this point in the operating cycle. Thereafter the centering arms 229 and 230 are moved toward each other to engage the contact members 234 with the ends of the blank 25 and the blank is thus shifted longitudinally in one direction or the other to center the blank between the chucks. This is effected at the point in the cycle when the pawl 192 is idly retracted over the ratchet wheel 193 in preparation for the next feeding movement of the blank carrying member 182 as the actuating rod 187 moves downwardly. This movement of the rod 187 permits the bracket 239 carrying the cam plate 238 to move downwardly under the action of the spring 249 and through the rollers 236 on the ends of the centering arms 229 and 230 riding on the cam faces 237 of the plate the contact members 234 at the opposite ends of the arms are moved toward each other to engage the ends of the blank 25. In Fig. 9, the contact members 234 are shown in their advanced position, the blank having been longitudinally centered between the chucks 33 and 34, the transfer arm remaining at this position with the centered blank engaging the contact members for a period and then the centering arms 229 and 230 are retracted, thus leaving the blank centered and still yieldably gripped to the transfer arm.

Shortly after this period in the operating cycle, the flames from the forming burners 291 and 292 are deflected from the end walls 27 of the bulbs 26 by air from the nozzles 294 and 295, the valve 301 having been opened. In timed relation with the deflection of the forming flames, the levers 258 and 259 carrying the molds or dies 40 and 41 are advanced clockwise (Figs. 4 and 5) to coaxially align the molding cavities 273 with the tubes 26 and substantially at the same instant the drive to the spindle assemblages 34 and 35 is opened by the disengagement of the clutch members 51 and 52 and the brake shoe 57 is applied against the brake member 58 to immediately stop rotation of the chucks 33 and 34 and thereby the bulbs 26 carried thereby. Also substantially at this time the throttled three pound air pressure directed into the interior of the bulbs is cut off by the closing of the valve 161 and simultaneously therewith the spindle assemblages 35 and 36 are advanced toward each other to enter the bulbs 26 in the molding cavities 273. This is immediately followed by the opening of the valve 160 to direct the throttled six pound air pressure into the interior of the bulbs 26 which serves to blow the plastic end walls 27 against the molding cavity walls and thus to mold the bulb walls (Fig. 18). This last mentioned air pressure is then cut off by the closing of the valve 160.

Figure 2:
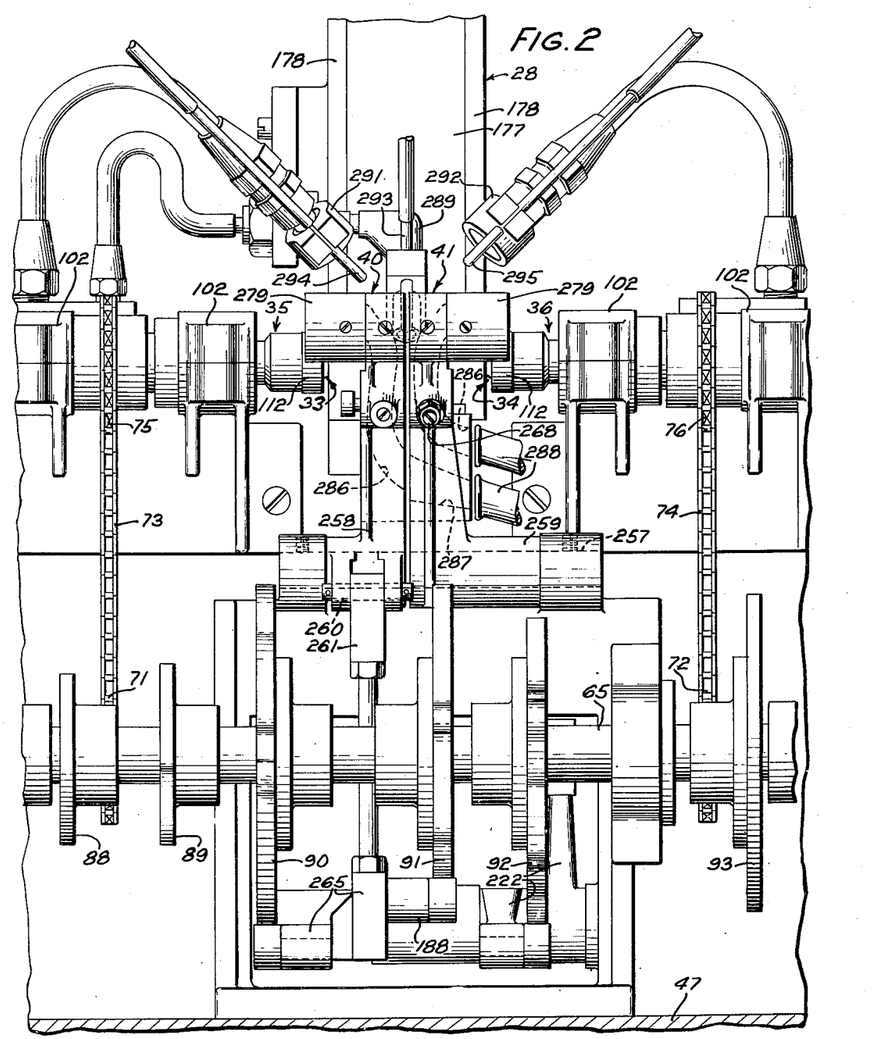
Fig. 2 is an enlarged fragmentary front elevational view of Fig. 1.

The spindle assemblies 35 and 36 are then retracted to the positions shown in Fig. 19, thus carrying the two identical completely formed bulbs 26 from the molding cavities 273 and to points clear of the receiving members 42 and 43. Immediately thereafter the levers 258 and 259 supporting the dies 40 and 41, to which are attached the receiving members 42 and 43, are retracted counterclockwise to the positions shown in Fig. 19 and during this positioning of the members 42 and 43, the chucks 33 and 34 are opened to release the bulbs 26 by movements of the sleeves 108, carrying the chuck heads 112, towards the left (Fig. 11) effected by counterclockwise movements of the sets of levers 124 and 135 under control of the set of cams 86 and 94. Simultaneously with the opening of the chucks the valve 160 is opened to direct the throttled six pound air pressure into the interior of the bulbs 26 which serves to eject them from the chucks into the aligned bulb-receiving passages 286 and thence into the fixed receiving tubes 288 (Figs. 2 and 6). The valve 160 is then closed and during its closing and after the bulbs have moved away from the ends of the chucks, the valve 170 is momentarily opened and 90 pound air pressure is directed through the spindle assemblages 35 and 36 to flush and clean them of any foreign particles therein. Following the ejection of the bulbs 26 from the chucks 33 and 34 and into the receiving tubes 288, the die and receiving member supporting levers 258 and 259 are further retracted counterclockwise to their normal clearance positions as shown in Figs. 4 and 5. Immediately preceding the return of the levers 258 and 259 to their normal positions, the blank transfer arm 203, which has remained stationary since the blank yieldably carried thereon was longitudinally centered relative to the chucks 33 and 34 by the centering mechanism 37, shown in dotted outline in the intermediate position of the transfer arm in Fig. 5, continues its counterclockwise advance until the top screw 263 thereon engages the stop member 282. In this full line position (Fig. 5) of the transfer arm 203, the blank 25 is coaxially aligned with the retracted and idle chucks 33 and 34. The spindle assemblages 35 and 36 are now advanced to their innermost positions (Fig. 16) to enter the opposite ends of the blank 25 in the chucks 33 and 34, which is followed immediately by the engagement of the clutch members 51 and 52, to cause rotation of the spindle assemblages 35 and 36, and, simultaneously therewith, the closing of the valve 300, which cuts off the deflecting air from the nozzle 293, the cutting flame from the burner 289 being now applied to the blank 25 intermediate its ends. Also, at this time, the chuck 34 is closed to grip one end of the blank to the rotating spindle assemblage 36 and the blank transfer arm 203 is moved counterclockwise (Figs. 4 and 5) by the action of the spring 227 under the control of the cam 92.

It will be understood that the blank levelling and retaining member 209 yields and swings clockwise as the blank entered in the chucks 33 and 34 is stripped from the moving transfer arm 203. Finally the chuck 33 is closed to grip the blank at its opposite end, the two chucks now acting in unison to rotate the blank. The purpose of not closing both chucks at the same time to grip opposite ends of the blank is to prevent strain on the blank, tending to fracture it in case of non-coaxial alignment of the chucks. Thus, with the cutting flame playing on the blank for a predetermined period while gripped by one chuck, the flame will heat and soften the blank at a point midway of its length and then, when the second chuck is closed to grip the blank, there will be no tendency for the blank to fracture, for it will flex sufficiently to prevent it.

The transfer arm 203 has now reached the right hand dotted outline position thereof (Fig. 5), thus entering the blank levelling and retaining member 209 in the chute or channel 184, and while it rests there, the pawl actuating rod 187 is raised to the position shown in Fig. 4 and thus, through the pawl 192 actuated thereby, a blank is fed from the rotary blank carrying member 182 and dropped into the chute 184 and thus onto the inclined levelling face 117 of the member 209, as shown in dotted outline in Fig. 5. A further clockwise movement of the transfer arm 203 now takes place and, upon it reaching its extreme right hand position (Fig. 4), the pivotal blank levelling and retaining member 209 carried thereon is moved clockwise as its cam face 220 engages the roller 221, whereupon the levelled blank 25 resting upon the inclined face 117 of the member 209 is permitted to move into position and rest against the shouldered face 213 of the arm 203. The cycle of operations is thus completed and, in the continued operation of the apparatus, may be repeated.

What is claimed is:

1. In an apparatus for forming two bulbs from a blank, aligned chucks movable toward and away from each other to grasp and rotate the blank from both ends, a support for positioning a blank in alignment with and between said aligned chucks, means for heating the blank intermediate its ends, means for rotating said chucks, means for moving said chucks toward each other, means for moving said chucks away from each other to pull apart the blank at its intermediate heated portion to form two bulbs having end walls on their adjacent ends, means for exteriorly heating the end walls, means for introducing air under pressure through said chucks into the bulbs to prevent their collapse during said last heating thereof, dies movable into position to receive the adjacent walled ends of the bulbs upon said chucks being moved again toward each other, means for introducing air under greater pressure than said first pressure through said chucks into the bulbs to mold the end walls thereof against said dies, means for intermittently controlling the introduction of said air under pressures through said chucks into the bulbs, and individual sources for said different air pressures connected to said control means.

2. In an apparatus for forming two bulbs from a blank, a support for positioning a blank in a working position, a pair of chucks movable toward and away from each other and aligned with opposite ends of said blank in the working position, means for moving the chucks to grasp the ends of the blank, means for rotating said chucks, means for heating the blank intermediate its ends, means for moving said chucks away from each other to pull apart the blank at its intermediate heated portion to form two bulbs having end walls on their adjacent ends, dies movable into position to receive the adjacent walled ends of the blanks, means for introducing air under pressure through said chucks into the bulbs to first mold the end walls thereof against said dies and for later ejecting the bulbs, means for effecting opening of said chucks after the walls have been molded and before said pressure is again introduced through said chucks into the bulbs for ejecting the same, means carried on said dies for receiving the ejected bulbs when the dies are moved from their operative positions, and means for intermittently controlling the introduction of said air pressure through said chucks into the bulbs.

3. In an apparatus for forming two bulbs from a blank, means for supporting a blank in a working position, a pair of chucks aligned with opposite ends of said blank in the working position, means for advancing the chucks to grasp the blank, means for heating the blank grasped by the chucks, means for moving the chucks apart to sever the blank, means for feeding air under pressure through the chucks to mold the severed parts of the blank, means for ejecting the molded bulbs, auxiliary means for directing air under a different pressure through the chucks for cleansing the same, and valve means for controlling the flow of air under said different pressures.

4. In an apparatus for forming two bulbs from a blank, a support for positioning a blank in a working position, a pair of chucks movable toward and away from each other and aligned with opposite ends of said blank in the working position, means for moving the chucks to grasp the ends of the blank, means for rotating said chucks, means for heating the blank intermediate its ends, means for moving said chucks away from each other to pull apart the blank at its intermediate heated portion to form two bulbs having end walls on their adjacent ends, dies movable into position to receive the adjacent walled ends of the blanks, an air passage in each of said chucks, a source of air under relatively low pressure, a second source of air under a relatively high pressure, valve means operable to direct the air from the low pressure source through said air passages, means for operating said valve means when the dies are in position to receive the ends of the blanks to mold them and after the blanks are formed to eject them, a second valve means operable to direct the air from the high pressure source through the chucks to cleanse the passages, and means to operate the second valve means after the blanks are ejected.

5. In an apparatus for forming two bulbs from a blank, a support for positioning the blank in a working position, a pair of chucks movable toward and away from each other and aligned with opposite ends of the blank in the working position, means for moving the chucks toward each other to grasp the ends of the blank, means for rotating said chucks, means for heating the blank intermediate its ends, means for moving said chucks away from each other to pull apart the blank at its intermediate heated portion to form two bulbs having end walls on their adjacent ends, dies movable into position to receive the adjacent walled ends of the bulbs, means for introducing air under pressure through said chucks into the bulbs to mold the end walls thereof against said dies and for later ejecting the bulbs, means for effecting opening of said chucks after the walls have been molded and before the air under pressure is again introduced through said chucks into the bulbs for ejecting the same, means for introducing air under greater pressure than said first pressure through said chucks for cleansing the same upon ejection of the bulbs, means for intermittently controlling the introduction of said air under pressures through said chucks into the bulbs, and individual sources for said different air pressures connected to said control means.

6. In an apparatus for forming two bulbs from a blank, a support for positioning the blank in a working position, a pair of chucks movable toward and away from each other and aligned with opposite ends of the blank in the working position, means for moving the chucks toward each other to grasp the ends of the blank, means for rotating said chucks, means for heating the blank intermediate its ends, means for moving said chucks away from each other to pull apart the blank at its intermediate heated portion to form two bulbs having end walls on their adjacent ends, means for exteriorly heating the end walls, means for introducing air under pressure through said chucks into the bulbs to prevent their collapse during said last heating, dies movable into position to receive the adjacent walled ends of the bulbs, means for introducing air under greater pressure than said first pressure through said chucks into the bulbs to mold the end walls thereof against said dies and for later ejecting the bulbs, means for effecting opening of said chucks after the walls have been molded and before the said air under greater pressure is again introduced through said chucks into the bulbs for ejecting the same, means for introducing air under greater pressure than said second pressure through said chucks for cleansing the same upon ejection of the bulbs, means for intermittently controlling the introduction of said air under the different pressures through said chucks into the bulbs, and individual sources for said different air pressures connected to said control means.

ADOLPH E. DROBISH.

REFERENCES CITED

The following references are of record in the file of this patent:

UNITED STATES PATENTS

| Number | Name | Date |
|---|---|---|
| 263,023 | Connolly | Aug. 22, 1882 |
| 1,888,851 | Donovan et al. | Nov. 22, 1932 |
| 2,050,088 | Dichter | Aug. 4, 1936 |
| 2,227,224 | Kimble et al. | Dec. 31, 1940 |
| 2,406,101 | Pipping | Aug. 20, 1946 |

FOREIGN PATENTS

| Number | Country | Date |
|---|---|---|
| 527,692 | Great Britain | Oct. 14, 1940 |